US012662365B2

(12) United States Patent
Wu

(10) Patent No.: US 12,662,365 B2
(45) Date of Patent: Jun. 23, 2026

(54) FUEL TANK CAP AND FUEL FILLER DEVICE FOR A VEHICLE

(71) Applicant: COPLUS INC., Tainan City (TW)

(72) Inventor: Po-Hua Wu, Tainan City (TW)

(73) Assignee: COPLUS INC., Tainan City (TW)

( * ) Notice: Subject to any disclaimer, the term of this patent is extended or adjusted under 35 U.S.C. 154(b) by 0 days.

(21) Appl. No.: 19/068,725

(22) Filed: Mar. 3, 2025

(65) Prior Publication Data

US 2026/0152377 A1 Jun. 4, 2026

(30) Foreign Application Priority Data

Dec. 4, 2024 (TW) ................................ 113146913

(51) Int. Cl.
*B67D 7/04* (2010.01)

(52) U.S. Cl.
CPC ..................................... *B67D 7/04* (2013.01)

(58) Field of Classification Search
CPC ................................ B67D 7/04; B60K 15/04
See application file for complete search history.

(56) References Cited

U.S. PATENT DOCUMENTS

2002/0017524 A1* 2/2002 Hagano .................. B60K 15/04 220/304
2007/0228308 A1* 10/2007 Jahnke ................... B60K 15/04 251/1.1
2011/0100985 A1* 5/2011 Tsiberidis ............. B60K 15/04 220/86.2

* cited by examiner

*Primary Examiner* — Jason K Niesz
(74) *Attorney, Agent, or Firm* — Burris Law, PLLC

(57) ABSTRACT

A fuel filler device for a vehicle includes an adaptor and a fuel tank cap. The adaptor includes two engaging protrusions projecting from an inner peripheral surface. Each engaging protrusion has a retaining portion projecting downwardly. The fuel tank cap is removably mounted on the adaptor, and includes an insert portion rotatably inserted into the adaptor, and two retained protrusions projecting radially from an outer peripheral surface of the insert portion. Each retained protrusion has a first retained slot and a second retained slot angularly spaced apart from each other. Either the first retained slot or the second retained slot is in longitudinal engagement with the retaining portion to prevent undesired removal of the cap from the adaptor during driving of the vehicle.

7 Claims, 6 Drawing Sheets

FUEL TANK CAP AND FUEL FILLER DEVICE FOR A VEHICLE

CROSS-REFERENCE TO RELATED APPLICATION

This application claims priority to Taiwanese Patent Application No. 113146913, filed on Dec. 4, 2024, and incorporated by reference herein in its entirety.

FIELD

The disclosure relates to a fuel filler device, and more particularly to a removable fuel tank cap of a fuel filler device for a vehicle.

BACKGROUND

A conventional fuel filler device for a vehicle generally includes an adaptor connected with a fuel filler pipe of a fuel tank, and a fuel tank cap removably mounted on the adaptor. The adaptor includes a surrounding wall and two arcuate abutting strips projecting radially from an inner peripheral surface of the surrounding wall and angularly spaced apart from each other to define two access slots therebetween. The fuel tank cap includes a gripped cap body, an insert portion extending downwardly from the gripped cap body to be rotatably inserted into the surrounding wall, and two retained protrusions projecting radially from an outer peripheral surface of the insert portion. The retained protrusions are respectively aligned with and inserted into the access slots to insert the insert portion of the fuel tank cap into the surrounding wall of the adaptor and are disposed downwardly of the abutting strips. Subsequently, the fuel tank cap is turned relative to the adaptor to move the retained protrusions and retain the retained protrusions on lower portions of the abutting strips. However, the fuel tank cap might fall off due to vibrations generated by the vehicle when the vehicle is in motion.

SUMMARY

Therefore, an object of the disclosure is to provide a fuel tank cap and a fuel filler device that can alleviate at least one of the drawbacks of the prior art.

According to one aspect of the disclosure, the fuel filler device is adapted to be connected with a fuel filler pipe, and includes an adaptor and a fuel tank cap mounted on the adaptor. The adaptor is securely connected with the fuel filler pipe, and includes a surrounding wall extending longitudinally, and two engaging protrusions projecting radially from an inner peripheral surface of the surrounding wall and radially spaced apart from each other. The engaging protrusions extend circumferentially and are angularly spaced apart from each other by two access slots. Each of the engaging protrusions has a guiding portion which extends from one of the access slots toward another one of the access slots, and a retaining portion which projects downwardly from the guiding portion adjacent to the another one of the access slots. The guiding portion has a guiding surface which faces downwardly and which is inclined upwardly from an end adjacent to the retaining portion toward another end distal from the retaining portion. The fuel tank cap is removably and longitudinally insertable into the adaptor, and includes a gripped cap body which is disposed on the adaptor to cover an upper opening of the surrounding wall, an insert portion which extends downwardly from a bottom surface of the gripped cap body to be rotatably inserted into the surrounding wall, and two retained protrusions which project radially from an outer peripheral surface of the insert portion and are diametrically opposite to each other. The two retained protrusions are moved longitudinally with the insert portion to respectively pass through the access slots. Each of the retained protrusions has a press-fit surface which faces upwardly, and a first retained slot and a second retained slot which are recessed from the press-fit surface and angularly spaced apart from each other. Either the first retained slot or the second retained slot of each of the retained protrusions is in longitudinal engagement with the retaining portion of a corresponding one of the engaging protrusions. The fuel tank cap is operably rotated relative to the adaptor between an opened position, where the retained protrusions are aligned with and disposed downwardly of the access slots, and a closed position, where the press-fit surface of each of the retained protrusions abuts upwardly against the guiding surface of a corresponding one of the engaging protrusions, and the retaining portion of each of the engaging protrusions is engaged downwardly in either the first retained slot or the second retained slot of the corresponding one of the retained protrusions.

According to another aspect of the disclosure, the fuel tank cap is mountable on an adaptor of a fuel filler device. The adaptor includes a surrounding wall extending longitudinally, and two engaging protrusions projecting radially from an inner peripheral surface of the surrounding wall and radially spaced apart from each other. The engaging protrusions extend circumferentially and are angularly spaced apart from each other by two access slots. Each of the engaging protrusions has a guiding portion which extends from one of the access slots toward the another one of the access slots, and a retaining portion which projects downwardly from the guiding portion adjacent to the another one of the access slots. The fuel tank cap is removably and longitudinally insertable into the adaptor, and includes a gripped cap body which is mountable on the adaptor to cover an upper opening of the surrounding wall, an insert portion which extends downwardly from a bottom surface of the gripped cap body to be rotatably inserted into the surrounding wall, and two retained protrusions which project radially from an outer peripheral surface of the insert portion and are diametrically opposite to each other. The two retained protrusions are moved longitudinally with the insert portion to respectively pass through the access slots. Each of the retained protrusions has a press-fit surface which faces upwardly, and a first retained slot and a second retained slot which are recessed from the press-fit surface and angularly spaced apart from each other. The fuel tank cap is operably rotated relative to the adaptor between an opened position, where the retained protrusions are aligned with and disposed downwardly of the access slots, and a closed position, where the press-fit surface of each of the retained protrusions abuts upwardly against the guiding portion of a corresponding one of the engaging protrusions, and either the first retained slot or the second retained slot of each of the retained protrusions is in longitudinal engagement with the retaining portion of the corresponding one of the engaging protrusions.

With the retained protrusions having the first and second retained slots, the first retained slots may retainingly engage with the retaining portions when the fuel tank cap is rotated to the closed position to prevent undesired removal of the fuel tank cap from the adaptor. When the fuel tank cap is rotated relative to the adaptor due to vibrations generated by the vehicle when the vehicle is in motion, the second retained slots may retainingly engage with the retaining portions to further prevent undesired removal of the fuel tank cap from the adaptor.

BRIEF DESCRIPTION OF THE DRAWINGS

Other features and advantages of the disclosure will become apparent in the following detailed description of the embodiments with reference to the accompanying drawings. It is noted that various features may not be drawn to scale.

DETAILED DESCRIPTION

Figure 1:
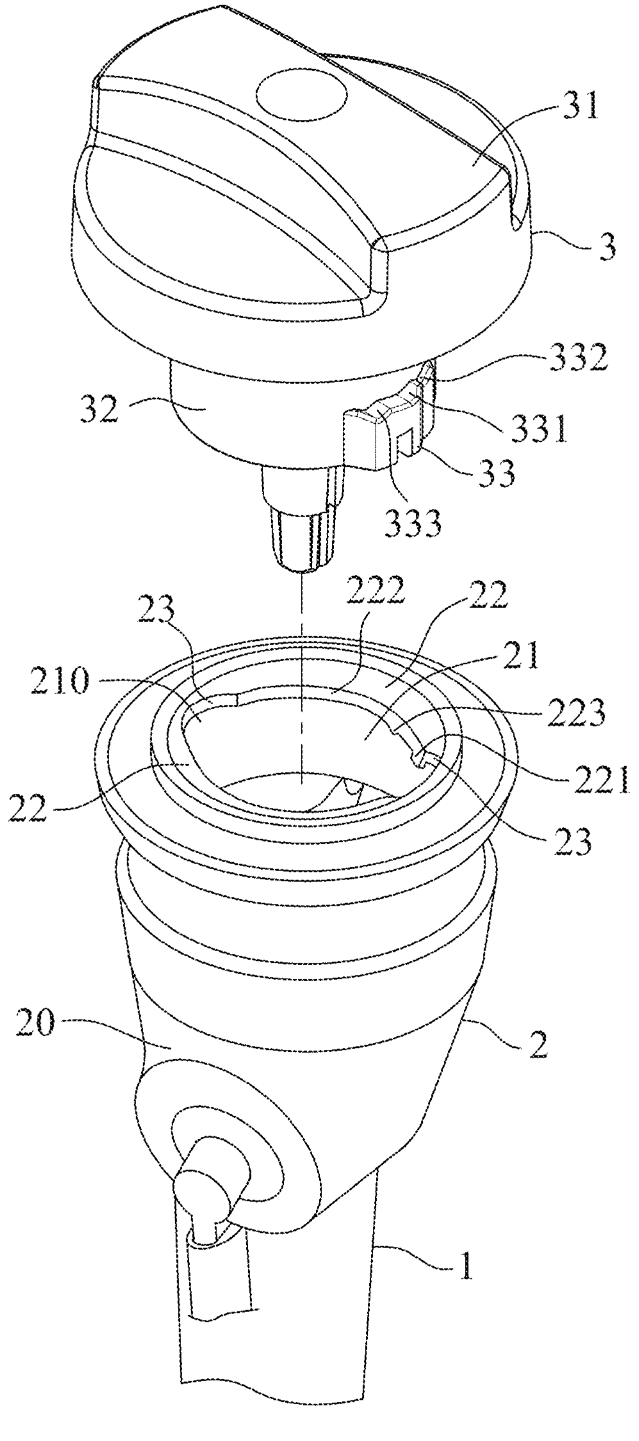
FIG. 1 is a fragmentary exploded perspective view illustrating an embodiment of a fuel filler device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
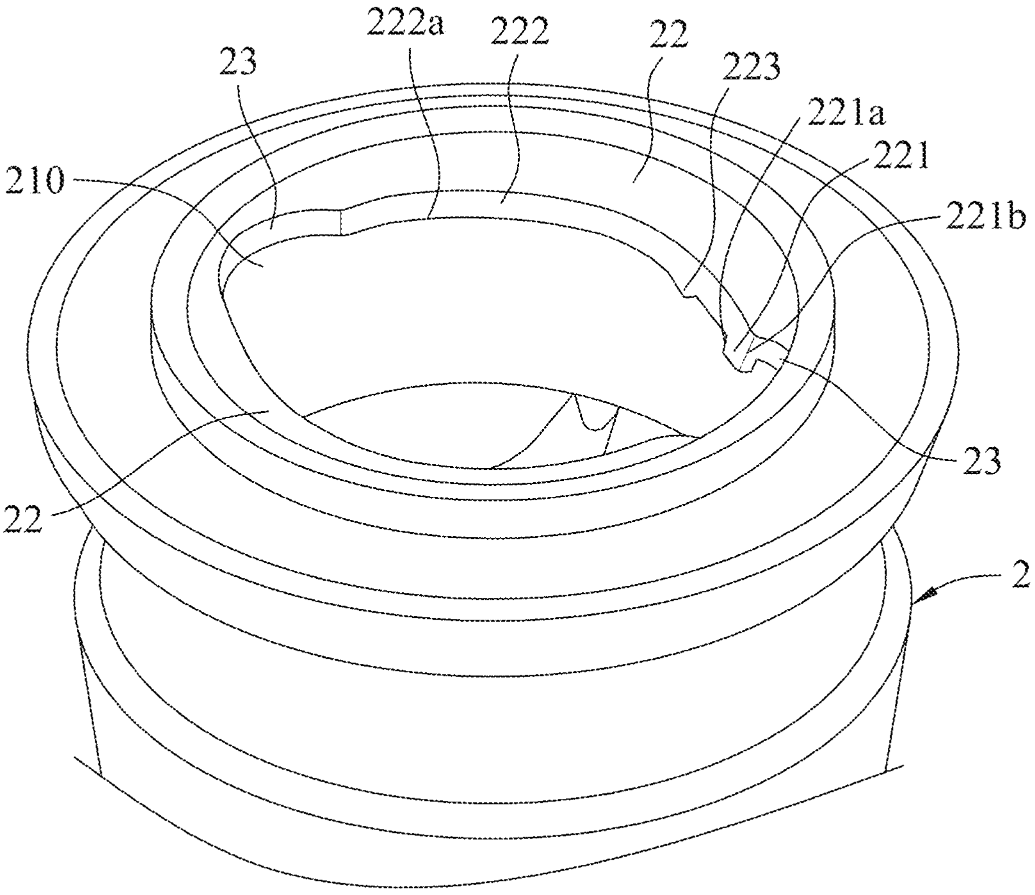
FIG. 2 is a fragmentary perspective view illustrating an adaptor of the embodiment.
Figure 3:
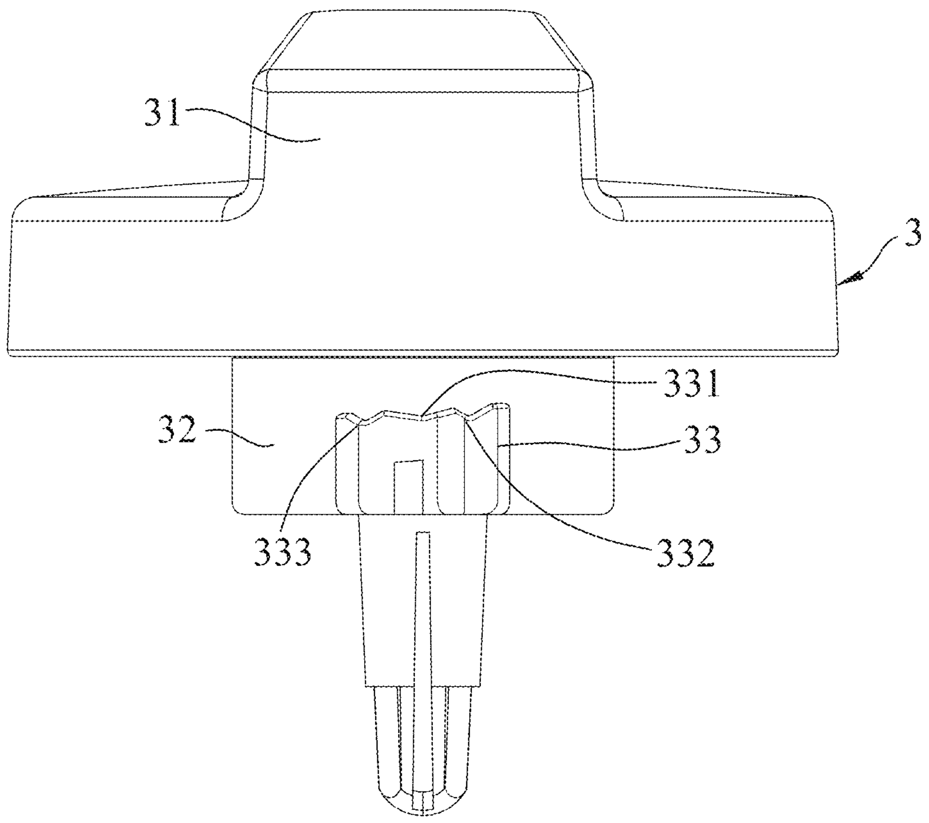
FIG. 3 is a front view of a fuel tank cap of the embodiment.

Referring to FIGS. 1 to 3, an embodiment of a fuel filler device according to the disclosure is adapted to be connected with a fuel filler pipe 1, and mounted on a vehicle. The fuel filler device includes an adaptor 2 which is securely connected with and is in communication with the fuel filler pipe 1, and a fuel tank cap 3 which is removably and longitudinally insertable into the adaptor 2.

In the embodiment, the adaptor 2 is disposed in an up-down direction. The adaptor 2 may be disposed and slightly inclined relative to the vehicle as required.

The adaptor 2 includes an adaptor body 20 secured to and in communication with the fuel filler pipe 1, a surrounding wall 21 disposed on and in communication with an upper end of the adaptor body 20 and extending longitudinally (i.e., in the up-down direction), and two engaging protrusions 22 projecting radially from an inner peripheral surface of the surrounding wall 21 and radially spaced apart from each other.

Specifically, the surrounding wall 21 has an upper opened section 210. The engaging protrusions 22 extend circumferentially and are angularly spaced apart from each other by two access slots 23 at the upper opened section 210.

Each of the engaging protrusions 22 has a stop portion 221 at an end adjacent to one access slot 23, an arcuate guiding portion 222 which extends in a counterclockwise direction from the stop portion 221 to another access slot 23, and a retaining portion 223 which projects downwardly from the guiding portion 222 and is adjacent to but spaced apart from the stop portion 221.

Also, the stop portion 221 projects downwardly from the guiding portion 222 and is located between the other access slots 23 and the retaining portion 223. The stop portion 221 has a first abutting surface 221*a* which faces the retaining portion 223, and a second abutting surface 221*b* which is opposite to the first abutting surface 221*a* and is located downwardly of the corresponding one of the access slots 23. The guiding portion 222 has a guiding surface 222*a* which faces downwardly and which is inclined upwardly from an end adjacent to the retaining portion 223 toward another end distal from the retaining portion 223. The retaining portion 223 projects downwardly from the guiding surface 222*a* of the corresponding one of the guiding portions 222.

The fuel tank cap 3 includes a gripped cap body 31 which is disposed on the adaptor 2 to cover an upper opening of the surrounding wall 21, an insert portion 32 which extends downwardly from a bottom surface of the gripped cap body 31 to be rotatably inserted into the surrounding wall 21, and two retained protrusions 33 which project radially from an outer peripheral surface of the insert portion 32 and are diametrically opposite to each other.

The retained protrusions 33 are disposed downwardly of and spaced apart from the gripped cap body 31. Each retained protrusion 33 has a press-fit surface 331 which faces upwardly, and a first retained slot 332 and a second retained slot 333 which are recessed from the press-fit surface 331 and angularly spaced apart from each other. In the embodiment, the first retained slot 332 and the second retained slot 333 are arranged in a clockwise direction.

Figure 4:
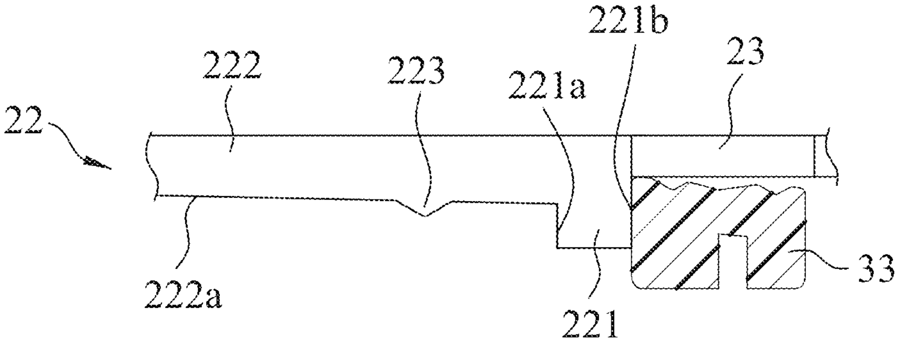
FIG. 4 is a fragmentary, partly sectioned view illustrating a state when the fuel tank cap is in an opened position.
Figure 5:
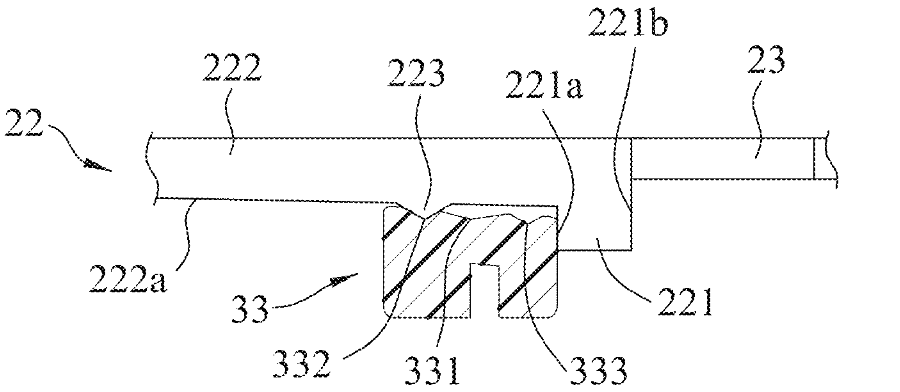
FIG. 5 is a fragmentary, partly sectioned view illustrating a state when the fuel tank cap is in a closed position.

With reference to FIGS. 1, 4 and 5, in practice, the fuel tank cap 3 is operated to rotate relative to the adaptor 2 between an opened position (as shown in FIG. 4) and a closed position (as shown in FIG. 5). When the fuel tank cap 3 is in the opened position, the fuel tank cap 3 is movable upwardly to be removed from the adaptor 2 so as to expose the upper opened section 210.

When it is desired to assemble the fuel tank cap 3 to the adaptor 2, the retained protrusions 33 of the fuel tank cap 3 are respectively aligned with the access slots 23 and moved downwardly to pass through the access slots 23 so as to insert the insert portion 32 into the surrounding wall 21 of the adaptor 2. At this stage, the fuel tank cap 3 is in the opened position.

Subsequently, the gripped cap body 31 is operated to rotate the fuel tank cap 3 in the clockwise direction such that the retained protrusions 33 are moved relative to the guiding portions 222 along with the rotation of the insert portion 32 to bring the press-fit surfaces 331 of the retained protrusions 33 to abut upwardly against the guiding surfaces 222*a* of the engaging protrusions 22, until the retaining portions 223 of the engaging protrusions 22 are engaged downwardly in the first retained slots 332 of the retained protrusions 33 and the retained protrusions 33 abut against the first abutting surfaces 221*a* of the stop portions 221. At this stage, the fuel tank cap 3 is in the closed position and is retained on the adaptor 2 so that the gripped cap body 31 may cover and close the upper opening of the upper opened section 210 of the surrounding wall 21.

When it is desired to open the fuel tank cap 3, the gripped cap body 31 is operated to rotate the fuel tank cap 3 in the counterclockwise direction such that the retained protrusions 33 are moved relative to the guiding portions 222 along with the rotation of the insert portion 32 to be removed from the retaining portions 223, until the retained protrusions 33 respectively abut against the second abutting surfaces 221*b*, and the retained protrusions 33 are respectively located below the access slots 23. At this stage, the fuel tank cap 3 is in the opened position such that the fuel tank cap 3 may be lifted and the retained protrusions 33 are moved upwardly along the access slots 23 so as to be removed from the adaptor 2.

Figure 6:
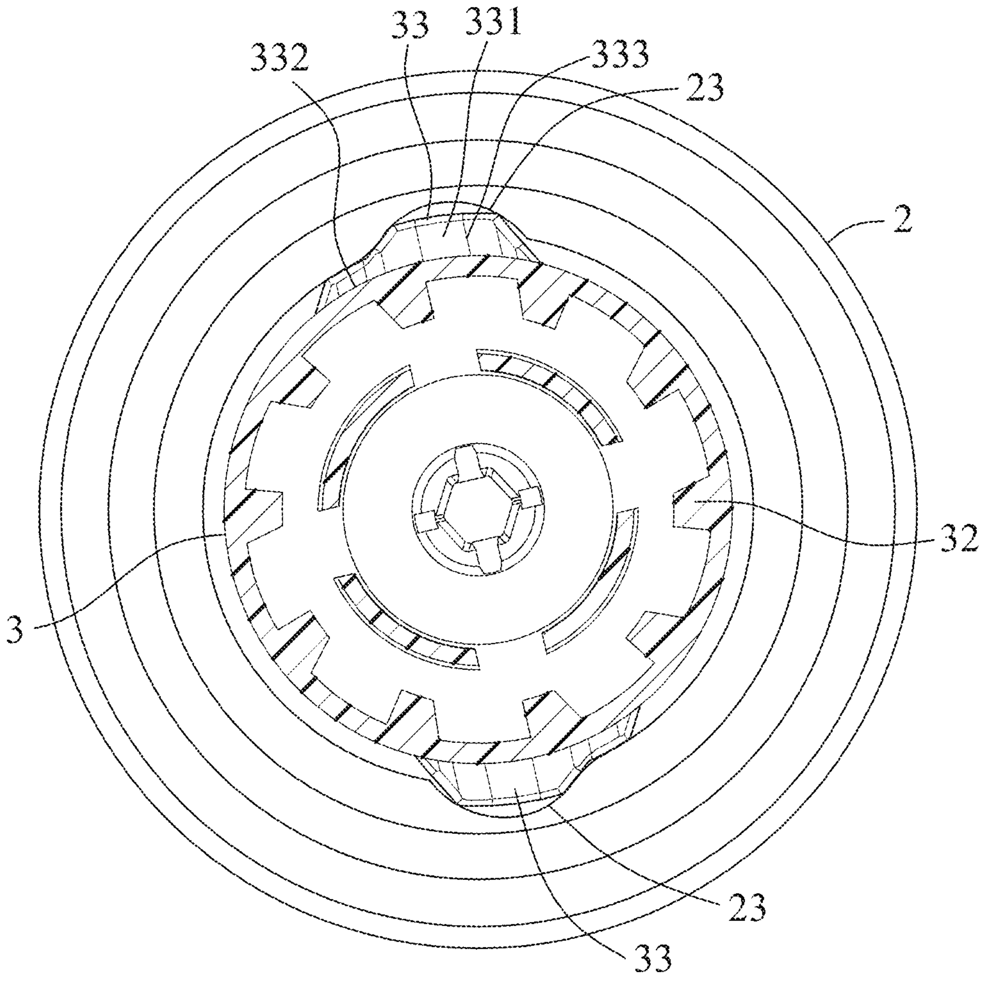
FIG. 6 is a cross-sectional view illustrating a state when the fuel tank cap is in the opened position.

With reference to FIGS. 1, 2 and 6, in the embodiment, each of the access slots 23 is in the form of an arcuate slot for permitting longitudinal movement of a corresponding one of the retained protrusions 33. Alternatively, each of the access slots 23 may have an angular shape to permit longitudinal movement of the corresponding one of the retained protrusions 33 therealong.

In the embodiment, the fuel tank cap 3 is rotated in the clockwise direction to be tightened. In alternative embodiments, the fuel tank cap 3 may be rotated in the counterclockwise direction to be tightened. The engaging protrusions 22 are disposed to be a mirror image of each other horizontally.

Figure 7:
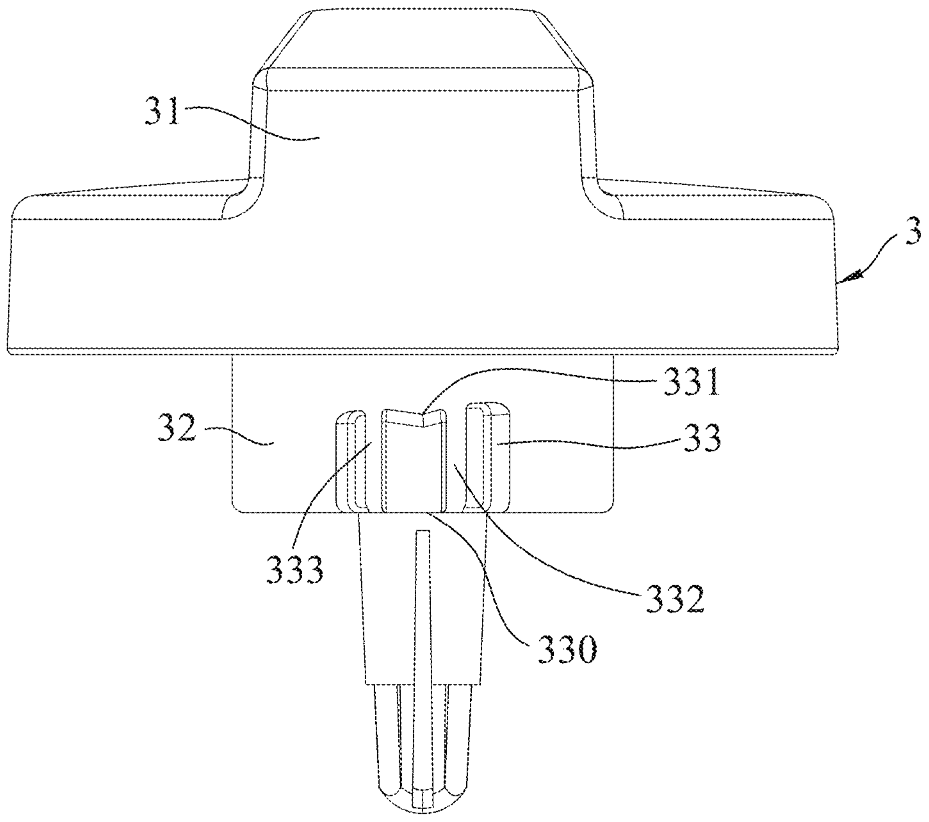
FIG. 7 is a front view similar to FIG. 3, illustrating the fuel tank cap in a modified form.

With reference to FIG. 7, in another embodiment, the first retained slot 332 of each retained protrusion 33 extends downwardly from the press-fit surface 331 through a lower surface 330 of the retained protrusion 33. The second retained slot 333 of each retained protrusion 33 extends downwardly from the press-fit surface 331 through the lower surface 330 of the retained protrusion 33.

As illustrated, with the retained protrusions 33 having the first and second retained slots 332, 333, the first retained slots 332 are retainingly engaged with the retaining portions 223 when the fuel tank cap 3 is rotated to the closed position to prevent undesired removal of the fuel tank cap 3 from the adaptor 2. Once the fuel tank cap 3 is vibrated and rotated relative to the adaptor 2 during driving of the vehicle, the second retained slots 333 are retainingly engaged with the retaining portions 223 so as to further prevent undesired removal of the fuel tank cap 3 from the adaptor 2.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A fuel filler device adapted to be connected with a fuel filler pipe, comprising:

an adaptor securely connected with the fuel filler pipe, said adaptor including a surrounding wall extending longitudinally, and two engaging protrusions projecting radially from an inner peripheral surface of said surrounding wall and radially spaced apart from each other, said engaging protrusions extending circumferentially and being angularly spaced apart from each other by two access slots, each of said engaging protrusions having a guiding portion which extends from one of said access slots toward another one of said access slots, and a retaining portion which projects downwardly from said guiding portion adjacent to said another one of said access slots, said guiding portion having a guiding surface which faces downwardly and which is inclined upwardly from an end adjacent to said retaining portion toward another end distal from said retaining portion; and a fuel tank cap removably and longitudinally insertable into said adaptor, said fuel tank cap including a gripped cap body which is disposed on said adaptor to cover an upper opening of said surrounding wall, an insert portion which extends downwardly from a bottom surface of said gripped cap body to be rotatably inserted into said surrounding wall, and two retained protrusions which project radially from an outer peripheral surface of said insert portion and are diametrically opposite to each other, said two retained protrusions being moved longitudinally with said insert portion to respectively pass through said access slots, each of said retained protrusions having a press-fit surface which faces upwardly, and a first retained slot and a second retained slot which are recessed from said press-fit surface and angularly spaced apart from each other, wherein said fuel tank cap is operably rotated relative to said adaptor between an opened position, where said retained protrusions are aligned with and disposed downwardly of said access slots, and a closed position, where said press-fit surface of each of said retained protrusions abuts upwardly against said guiding surface of a corresponding one of said engaging protrusions, and said retaining portion of each of said engaging protrusions is engaged downwardly in either said first retained slot or said second retained slot of a corresponding one of said retained protrusions.

2. The fuel filler device of claim 1, wherein said first retained slot of each of said retained protrusions extends downwardly from said press-fit surface through a lower surface of said retained protrusion.

3. The fuel filler device of claim 1, wherein said second retained slot of each of said retained protrusions extends downwardly from said press-fit surface through a lower surface of said retained protrusion.

4. The fuel filler device of claim 1, wherein each of said engaging protrusions further has a stop portion which projects downwardly from said guiding portion and is located between said another one of said access slots and said retaining portion, said stop portion having a first abutting surface which faces said retaining portion, and a second abutting surface which is opposite to said first abutting surface, wherein each of said retained protrusions abuts against said second abutting surface when said fuel tank cap is in the opened position, and abuts against said first abutting surface when said fuel tank cap is in the closed position.

5. A fuel tank cap mountable on an adaptor of a fuel filler device, the adaptor including a surrounding wall extending longitudinally, and two engaging protrusions projecting radially from an inner peripheral surface of the surrounding wall and radially spaced apart from each other, the engaging protrusions extending circumferentially and being angularly spaced apart from each other by two access slots, each of the engaging protrusions having a guiding portion which extends from one of the access slots toward another one of the access slots, and a retaining portion which projects downwardly from the guiding portion adjacent to the another one of said access slots, said fuel tank cap being removably and longitudinally insertable into the adaptor, and comprising:

a gripped cap body which is mountable on the adaptor to cover an upper opening of the surrounding wall;

an insert portion which extends downwardly from a bottom surface of said gripped cap body to be rotatably inserted into the surrounding wall; and two retained protrusions which project radially from an outer peripheral surface of said insert portion and are diametrically opposite to each other, said two retained protrusions being moved longitudinally with said insert portion to respectively pass through the access slots, each of said retained protrusions having a press-fit surface which faces upwardly, and a first retained slot and a second retained slot which are recessed from said press-fit surface and angularly spaced apart from each other, wherein said fuel tank cap is operably rotated relative to the adaptor between an opened position, where said retained protrusions are aligned with and disposed downwardly of the access slots, and a closed position, where said press-fit surface of each of said retained protrusions abuts upwardly against the guiding portion of a corresponding one of the engaging protrusions, and either said first retained slot or said second retained slot of each of said retained protrusions is in longitudinal engagement with the retaining portion of the corresponding one of the engaging protrusions.

6. The fuel tank cap of claim 5, wherein said first retained slot of each of said retained protrusions extends downwardly from said press-fit surface through a lower surface of said retained protrusion.

7. The fuel tank cap of claim 5, wherein said second retained slot of each of said retained protrusions extends downwardly from said press-fit surface through a lower surface of said retained protrusion.

* * * * *